Sept. 13, 1932.  G. GARIBALDI  1,877,655
FUEL FEED FOR INTERNAL COMBUSTION ENGINES
Filed Sept. 10, 1928
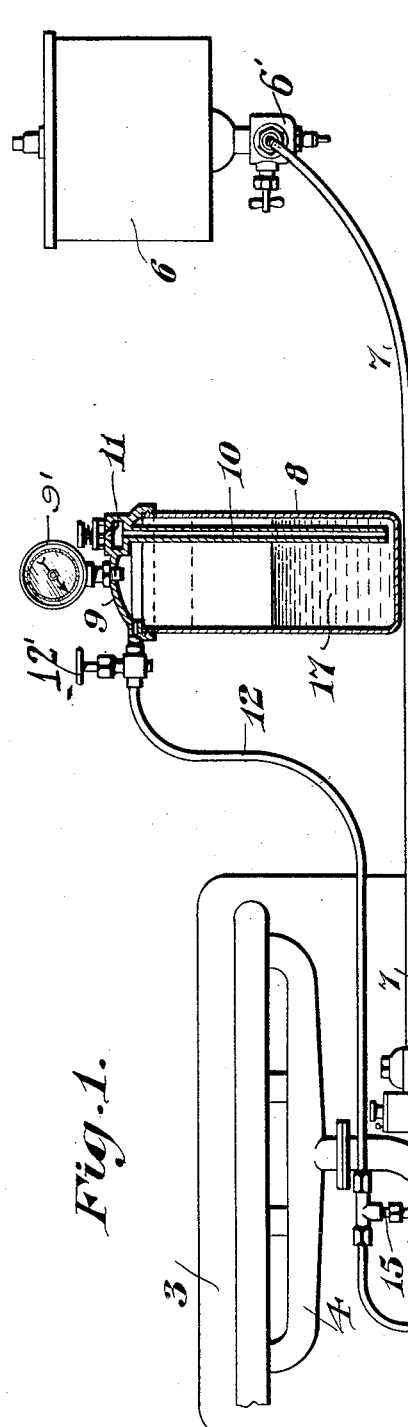
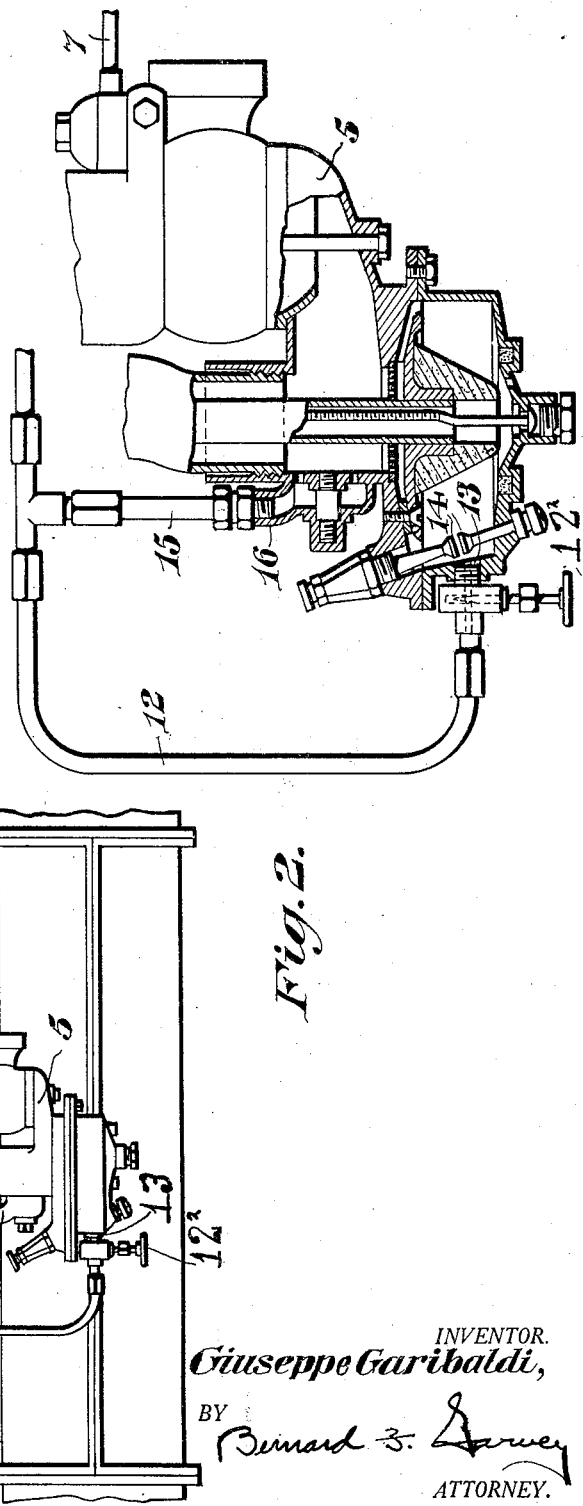
INVENTOR.
Giuseppe Garibaldi,
BY
ATTORNEY.

Patented Sept. 13, 1932

1,877,655

UNITED STATES PATENT OFFICE

GIUSEPPE GARIBALDI, OF STAMFORD, CONNECTICUT, ASSIGNOR TO FUEL OIL CARBU-
RETION CO. INC., OF NEW YORK, N. Y., A CORPORATION OF NEW YORK

FUEL FEED FOR INTERNAL COMBUSTION ENGINES

Application filed September 10, 1928. Serial No. 304,971.

The present invention relates to the method of and apparatus for preheating fuel for use in internal combustion engines. My invention contemplates the provision of simple and effective means, and a method, to allow the efficient use of ordinary fuel oil of low volatility in existing internal combustion engines. Such oil cannot now be used satisfactorily in engines having carburetors of the existing type, and it is therefore customary to use comparatively light, highly refined hydrocarbons as the fuel for operating the internal combustion engines of automobiles, air craft, motor-boats and the like.

Manifestly, the use of ordinary fuel oil of low volatility in high speed internal combustion engines is desirable for many reasons, but especially from an economical standpoint and to reduce the fire hazard, provided that the starting of the engine may be accomplished at least as easily as has been heretofore customary in the art with highly volatile fuel, and the operating efficiency of the engine not impaired. The present invention permits the use of ordinary fuel oils of low volatility, that cannot be satisfactorily used in existing types of the carburetors for internal combustion engines, as a motive fluid for high speed engines with easier and more expeditious starting and increased engine efficiency.

One of the principal objects of the present invention is to provide a preheating feed apparatus which is adapted for use on any standard type of gasoline engine and contemplates the use of a fuel converter and gasifier instead of carbureters as employed when gasoline or similar light hydrocarbons are used. The fuel preheating apparatus constructed in accordance with the teaching of the present invention is exceedingly simple in construction and effective in operation to permit operation of the latter with at least the efficiency attained by using gasoline without impregnating the products of combustion with noxious or harmful gases.

A further object of the invention is to introduce an inflammable fluid, preferably in the form of a thoroughly atomized vapor mixed with air, into a combustion chamber substantially simultaneously with the introduction into said chamber of a diverted portion of the fuel. The inflammable fluid being introduced into the chamber in the vicinity of an igniting device, a properly burning starting mixture for preheating the fuel is assured at all starting temperatures, and condensation of the fuel or inflammable liquid, or flooding of the device with condensed or liquid fuel, or back-firing, is prevented.

Other objects of the invention will be apparent from the following description of the present preferred form of the invention, wherein Fig. 1 is a side elevation view of a fuel feed constructed in accordance with the present invention, illustrating the application thereof, the gas feeding tank being shown in section; and Fig. 2 is a detailed fragmentary side elevational view of the preheating appartus, showing to advantage the manner of connecting the gas feeding pipes with the combustion chamber and gasifier.

In order to illustrate the application of this invention a portion of a gasoline operated motor 3 is illustrated which may be of standard configuration and is equipped with the usual intake manifold 4 which is adapted to receive a fuel converter and gasifier, generally designated 5. Said fuel converter and gasifier insofar as the atomizing of the fuel and mixing the fuel with air, is concerned, may be of a construction more or less known in the art and hence which need not be described in detail. It need merely be pointed out that the fuel is fed to the device 5 from a suitable supply tank as 6 through a valved filter as 6', and thence into a feed pipe 7, from which the liquid fuel passes into the device 5 in substantially the usual manner. It will be understood that the suction of the engine withdraws liquid fuel from the device 5, atomizes said fuel, mixes it with air and allows a portion of the fuel so atomized and mixed to be diverted into a suitable combustion chamber where the mixture is intended to be ignited. The principal feature of my invention, however, consists in making it possible for that portion of the fuel which is diverted into the combustion chamber to burn steadily in said chamber. Toward this end, I have devised the expedient of introducing into said chamber in the vicinity of the igniting means illustrated as the spark plug 14, an inflammable mixture substantially in gaseous form, which allows starting of the engine efficiently irrespective of the outside temperature. The inflammable fluid which I will hereinafter refer to as a gas, may be thoroughly atomized gasoline, ether, or the like mixed with the proper proportion of air. The inflammable fluid or gas may be fed continuously to the combustion chamber or may be cut off at any time desired by means of suitable valves as will be pointed out more fully hereinafter. An important feature of my invention is the introduction of the inflammable fluid or gas directly into the combustion chamber preferably in the vicinity of the igniting means substantialy simultaneously with the introduction into said chamber of the atomized fuel. Since the gas mixes almost instantaneously with the fuel so introduced into the chamber, an ignitable mixture is formed incapable of detonating or back-firing. Furthermore, the mixture so formed cannot condense due to the instant ignition thereof, and thereby flooding of the chamber is prevented. Finally, the proportion of gas and fuel can readily be adjusted so as to form a comparatively slow burning mixture which does not detonate or explode, and thereby back-firing is also prevented. When it is understood that condensation or flooding and back-firing have been the principal and serious objections to previous devices of the character here involved, it will be seen that the provision of apparatus making it possible to properly burn the fuel diverted into the combustion chamber is an important step in advance in the art.

The means for feeding the inflammable fluid directly into the combustion chamber, and forming an important feature of my invention, may, if desired, include a suitable container for holding and atomizing the fluid such as for example, the tank 8 which may be of any desired size and made from any desired material. The tank 8 may be provided with a detachable closure or cap 9 which has an opening therein communicating on the interior with an air pipe 10 which depends in the tank from the closure 9 to a point in proximity to the bottom of the tank. The opening in the lid is normally closed by a spring pressed valve 11. The valve 11 is a one-way valve to permit air to be drawn therefrom into the tank, but preventing the contents of the tank from escaping. The closure 9 is equipped with a pressure gauge 9' which functions in the usual manner.

A gas pipe 12 is employed which has one end thereof extended through the lid or closure 9 and projects for a short distance into the tank. The gas pipe extends from the tank 8 to the gasifier and terminates at the bottom of the latter. The terminal of the pipe is tapped in into the combustion chamber of the gasifier, as indicated at 13, so that the gas conducted into said compartment will enter the chamber at approximately the sparking point of the electrodes 14. The gas pipe 12 has a tributary or branch 15 extending from an intermediate part thereof into engagement with the priming inlet nipple 16 of the fuel converter or gasifier, which is engaged with the engine intake manifold. Consequently, gas is also permitted to pass into the gasifier nipple and in the present instance is shown directly below the so-called fuel converter butterfly in the path of the inlet end of the intake manifold. If desired, the gas intake may be positioned above the butterfly or inserted into the manifold at any other point desired. The gas pipe 12 is provided with a main control valve 12' near the tank 8 and a supplemental valve $12^2$ near the inlet 13. Either of said valves may be used to cut off the supply of gas after the engine has once been started. Either or both valves may further be used for the purpose of regulating the proportion of gas fed to the combustion chamber, so that the ignitable mixture entering said chamber at any time is in the proper condition to be ignited instantaneously, if desired.

The tank 8 is adapted to receive ether or some other highly inflammable and volatile explosive gas emitting liquid. As illustrated in Fig. 1 it is intended that the level of the ether, designated 17, be remote from the top of the tank in order to provide a gas space or zone into which the inlet end of the pipe 12 extends. The air pipe 10 depends into the ether 17 but is sufficiently spaced from the bottom of the tank so that air passing through the valved opening in the lid 9 may find its way out of the bottom of the pipe and upwardly through the ether to be carried off by the pipe 12.

It will be understood that for the tank 8 and the various atomizing pipes carried thereby, may be substituted any atomizer, sprayer, pump or similar device of well known types which need not be described in detail and which are capable of functioning in the manner described to introduce an inflammable gaseous mixture directly into the combustion chamber.

In use of this device the fuel oil is drawn from the oil supply tank 6 to the fuel converter or gasifier through the pipe 7 on the suction stroke of the engine or in any other manner known in the art. Simultaneously the suction stroke of the engine creates a syphonic action in the pipe 12 to draw air through valved opening in the lid 9 downwardly through the pipe 10 and upwardly through the liquid into the pipe 12. The gas entering the combustion chamber of the gasifier is substantially instantaneously mixed with the fuel oil, which reaches the combustion chamber at the same time as the gas due to the adjustment of the valves 12' and 12². Gas also enters the device through the inlet nipple 16. A dense vapor stream is thus created which surges into the engine head to be acted upon by the ignition system of the engine in a manner well known in the art. The volume of fuel oil passing from the fuel tank 6 into the pipe 7 is of course controlled by the filter valve 6'. Correspondingly, the volume of gas passing from the tank 8 is controlled by the valves 12' and 12². Furthermore, if desired, extraneous means such as a pump, may be used for forcing the gas from the tank 8 into the fuel converter or if desired, such means may be used to augment the syphonic action created on the suction stroke of the engine. It has been found that expeditious starting is effected in this manner with an almost total absence of noxious gases in the exhaust products and the efficiency rating of the engine at least on a parity with engines operated by the lighter hydrocarbons, such as gasoline.

It is of course, to be understood that I have herein illustrated only a single structural embodiment of the invention which I have found by experiment carries out the principle of this invention. It is to be understood that various structural changes may be made within the scope of the claims hereto appended.

What is claimed is:

1. A fuel gasifier for internal combustion engines provided with a combustion chamber, including a fuel conversion and gasifier apparatus attached to the engine manifold, an inflammable gas inlet leading into the combustion chamber of the gasifier and means for simultaneously introducing fuel into the combustion chamber.

2. A method of feeding fuel, for internal combustion engines, consisting of diverting a portion of the fuel, mingling the diverted fuel and air and atomizing same into a heating chamber and simultaneously introducing a highly inflammable medium into said chamber, igniting the fuel, air and inflammable medium, leading the burnt mixture away from said chamber and introducing a highly inflammable medium into the mixture after it has left said chamber.

3. A fuel feed for internal combustion engines, including an atomizer equipped with fuel oil and air intake openings, a combustion and heating chamber in communication with the atomizer and equipped with an ignition zone and a gas inlet at the ignition zone, and a gas inlet above said zone.

4. Fuel oil feed apparatus, in combination with an internal combustion engine equipped with an intake manifold, intercommunicating atomizing and combustion chambers in communication with said manifold, said atomizing chamber having fuel oil and air inlets, and gas intake pipes in direct communication respectively with the combustion chamber and intake manifold.

5. In a device of the character described, a combustion chamber, ignition means in said chamber, a conduit for an inflammable fluid communicating with said chamber at a point intermediate the top and bottom of the chamber and at another point above said top, and a passage for delivering fuel to the chamber through the top thereof.

6. In a device of the character described, a combustion chamber, ignition means in said chamber, a branched conduit for an inflammable fluid, one end of said conduit terminating in said chamber intermediate the top and bottom thereof and adjacent the ignition means, and the corresponding end of the other branch communicating with said chamber through the top of the chamber, and a fuel passage to said chamber, whereby fuel and fluid reach said chamber substantially simultaneously.

7. In a device of the character described, a combustion chamber, an inlet for an inflammable fluid intermediate the top and bottom of the chamber, ignition means in the chamber beyond said inlet, a second inlet for inflammable fluid above and communicating with the chamber, and a fuel and air inlet to the chamber passing through the top thereof, said inlets being so proportioned that an ignitable but not detonatable mixture is formed between the fluid, fuel and air entering the chamber.

GIUSEPPE GARIBALDI.